United States Patent [19]

Cappo

[11] 4,147,646

[45] Apr. 3, 1979

[54] CAPACITOR CONTAINING A NAPHTHOXY SUBSTITUTED DIMETHYLSILOXANE DIELECTRIC FLUID

[75] Inventor: Gerald R. Cappo, Midland, Mich.

[73] Assignee: Dow Corning Corporation, Midland, Mich.

[21] Appl. No.: 836,448

[22] Filed: Sep. 26, 1977

[51] Int. Cl.$^2$ .............................................. H01B 3/46
[52] U.S. Cl. ..................................... 252/63.7; 361/315
[58] Field of Search ................. 252/63.7; 174/17 LF; 361/315, 327

[56] References Cited

U.S. PATENT DOCUMENTS

| | | | |
|---|---|---|---|
| 2,909,549 | 10/1959 | Bailey | 252/63.7 X |
| 3,125,634 | 3/1964 | Murray et al. | 96/1.1 X |
| 3,980,803 | 9/1976 | Yasufuku et al. | 252/63.7 X |

*Primary Examiner*—Harris A. Pitlick
*Attorney, Agent, or Firm*—Jack E. Moermond

[57] ABSTRACT

A capacitor containing a dielectric fluid which is a naphthoxy substituted dimethylsiloxane having a viscosity of less than about 50 centistokes at 25° C. is disclosed.

5 Claims, No Drawings

CAPACITOR CONTAINING A NAPHTHOXY SUBSTITUTED DIMETHYLSILOXANE DIELECTRIC FLUID

A capacitor is an electrical device for storing quantities of electricity in much the same way that a reservoir is a device for storing quantities of water. A capacitor consists of two electrodes or conductors separated by a dielectric material or insulator. Dielectric fluids can be used per se as an insulation material, but they most frequently are used in conjunction with solid insulations. The substitution of a dielectric fluid for the air or other gases in and around the solid insulation material in a capacitor generally results in improved dielectric strength and performance of the capacitor.

Over the years a wide variety of fluids have been used as dielectric fluids in various kinds of electrical devices. By way of example one might mention the classes of mineral oils, askarels, vegetable oils, organic esters, polyhydrocarbon oils, fluorinated liquids, and silicone liquids. As one might surmise from the foregoing host of materials which have been used as dielectric fluids, no one fluid is ideal or solves all of the industries needs. Also, as capacitor designs and construction materials have changed, the need for new, better and different dielectric materials has continued to grow. Regardless of the dielectric fluid used, it should result in capacitors which are economical to produce, reliable (i.e. have low failure rates), easy to manufacture, and which meet the highest safety and health standards.

It has been discovered in accordance with this invention that when a naphthoxy substituted dimethylsiloxane having a viscosity of less than about 50 centistokes at 25° C. is employed as the dielectric fluid in capacitors that not only is good electrical performance obtained, but the hazards of chlorinated materials are avoided and enhanced flammability characteristics can be achieved.

So far as is known at this time any naphthoxy substituted dimethylsiloxane having a viscosity of less than about 50 centistokes at 25° C. can be used as the dielectric fluid in the capacitor of this invention.

The most preferred dielectric fluid at this time is one having the general formula

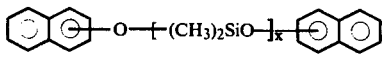

wherein x has an average value from about 2 to 22. Most preferably x has an average value in the range of about 6 to 15.

Other naphthoxy substituted dimethylsiloxanes within the scope of the present invention include cyclic siloxanes and siloxanes of the general formula

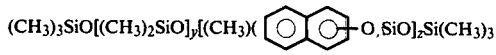

wherein y has an average value ranging from 1 to 10, z has an average value ranging from 1 to 10, and y has a value equal to or greater than the value of z.

The siloxanes useful in the present invention can be prepared by techniques well known to those skilled in the art. For example the preferred siloxanes above can be prepared by equilibrating dimethyldichlorosilane, dimethyldimethoxysilane or dimethyldiacetoxysilane with dimethylcyclosiloxanes and reacting the resulting product with naphthol. The other two siloxanes referred to above can be prepared by reacting the corresponding SiH containing siloxanes and naphthol in the presence of a noble metal catalyst such as platinum. Various other preparatory techniques will be readily apparent to those skilled in the art.

The viscosity of the naphthoxy substituted dimethylsiloxane fluid employed herein must be less than about 50 centistokes at 25° C. for use in the capacitor. This viscosity level is believed to be essential in order that proper impregnation of the capacitor be achieved within reasonable time constraints. Particularly preferred are those naphthoxy substituted dimethylsiloxane fluids having viscosities of less than 40 centistokes.

It is further essential to this invention that the substituent groups in the siloxane, other than the naphthoxy groups, be methyl groups. The substitution of other groups, such as the phenyl group for the methyl group, results in fluids not useful in the capacitor of the present invention due to, for example, excessively high viscosities. Thus while U.S. Pat. No. 3,125,634 discloses naphthoxy substituted siloxanes similar to those used in the present invention and makes the allegation in column 6, lines 70–73, that such fluids are also useful as dielectric fluids, the high viscosities of such fluids produced and the teaching that a viscosity of 100 to 50,000 centistokes for use in patentees' projection system make it clear that the siloxane fluids of the patent are not suitable in the present invention as dielectric fluids in capacitors.

Now in order that those skilled in the art may better understand how the present invention can be practiced, the following examples are given by way of illustration and not by way of limitation. All parts and percents are by weight and all viscosities measured at 25° C. unless otherwise specified. Also, in the examples which follow, the dielectric constants and dissapation factors were measured according to ASTM Test D924; the volume restivities were measured according to ASTM Test D257; and the flash and fire points were measured according to ASTM Test D92, Cleveland Open Cup.

In some examples corona inception and corona extinction voltages are reported. During use when a dielectric fluid is placed under increasing stress a point is reached where partial breakdown occurs. The voltage at which the capacitor will suddenly flash into partial discharge or corona is known in the art as the corona inception voltage. The corona will extinguish with a reduction of voltage. The corona extinction voltage is not a fixed value for each fluid but is a function of the intensity of corona before the voltage is reduced. For best results both the corona inception and corona extinction voltages should be as high and as close together as possible. The corona inception and corona extinction voltages reported in the examples were determined using small model capacitors having a 0.01 μf rating.

The test capacitor bodies were procured from Bycap Incorporated, 2554 Lawrence Avenue, Chicago, Illinois 60625. Both film/film and film/paper/film construction capacitors were used in the test program. The film/film capacitors (Part No. 11 A 302–103A) contain two 0.0005 inch thick polypropylene films while the film/paper/film capacitors (Part No. 11 B 302–103A) contain two 0.0005 inch thick polypropylene films and one 0.0004 inch thick kraft paper layer. The capacitors are made using tab type construction and have very wide margins to preclude flashover at the high test voltages. The corona performance of the two kinds of capacitors is nearly identical.

Number 18 copper wire leads are attached to the capacitor tabs using Stakon Butt Splices No. 2B14. One of each type of capacitor are placed together in a standard one ounce vial. Glass tubing sleeves are used to insulate the leads.

The capacitors are vacuum dried in a standard two liter reaction kettle. Wire racks were constructed to hold one to three vials in each kettle. Vacuum is provided by a mercury diffusion pump and a mechanical force pump. The vacuum system is capable of producing a 10 micron vacuum in the kettle. Test fluids are placed in 125 ml. pressure equalizing dropping funnels above the vials. Vacuum is maintained for four days at room temperature prior to impregnating the capacitors. Industry practice is to heat the capacitors during the vacuum drying period. However, with the small test capacitors and the open configuration of the vials it was not found to be necessary. Four days of vacuum corresponds to industry practice and is necessary to insure complete degassing of the polypropylene film.

After the fluid is dropped, the capacitors are allowed to soak for 24 hours prior to testing. Viscous fluids (above approximately twenty cs) sometimes require heat during the soaking period to insure complete impregnation. If heat is required; then 85° C. at atmospheric pressure for 24 hours has been found to be sufficient.

Capacitors were tested for corona using a Biddle Corona Dectector (Cat. No. 665609-1). This detector is capable of detecting a 2 pico coulomb discharge occurring over six micro seconds using the 0.01 $\mu f$ test capacitors. The capacitors are conditioned for a minimum of ten minutes before testing by being energized with 1200 volts alternating current. It is felt this conditioning helps eliminate "noise" by somehow reducing gas voids and/or other foreign bodies within the system. The voltage is then raised on the test capacitors at the rate of 200 to 300 volts/second until the corona initiation voltage (CIV) is reached. When the corona initiation voltage is reached there will be a sudden, almost instantaneous, increase in corona display on the detector cathode ray tube. The intensity of this "gassing" corona will increase with time if the voltage remains constant, or increase rapidly if the voltage is raised above the corona initiation voltage. Corona extinction voltage (CEV) is measured by reducing the voltage rapidly to an arbitrary value and observing the trend of corona intensity. If the corona decreases steadily and extinguishes, then the procedure is repeated with a higher arbitrary voltage selected. The highest arbitrary value that can be selected where the corona will extinguish is the corona extinction voltage. This voltage is not a constant. The CEV will be lower if the corona is allowed to become more intense before voltage reduction. If the voltage is reduced rapidly while the corona is still light, then very high corona extinction voltages may be observed. The value of the difference between the extinction voltages observed with light and heavy corona is greater with high viscosity fluids than with low viscosity fluids.

EXAMPLE 1

In a 500 ml, 3-necked, flask equipped with thermometer, mechanical stirrer and condenser connected to a dry-ice trap and drying tower there was combined 5 g. of an acid ion-exchanger resin catalyst (sulfuric acid supported on polystyrene—Amberlyst 15), 400 g. of dimethylcyclosiloxanes and 112 g. of dimethyldimethoxysilane. This mixture was heated at 90°–106° C. for about 17¼ hours, then cooled to 40° C. and filtered thru a coarse frit glass filter. The resulting mixture was then distilled (pot temperature 127° C., head temperature 84° C.) at 15–20 mm of mercury pressure to obtain 453 g. of a methoxy endblocked dimethylsiloxane fluid as the residue.

To a 500 ml., 3-necked flask, equipped as above and additionally containing a Dean-Stark trap and addition funnel there was added 100 ml. of toluene, 30 g. of 2-naphthol and then 51 g. of the above prepared methoxy endblocked dimethylsiloxane fluid. The resulting mixture was heated to reflux temperature and azeotroped for about 10 minutes to yield a clear rust colored solution. Upon cooling a solid precipitate formed. Next 0.2 ml. of a tetramethylguanidine/trifluoroacetic acid (⅓ weight ratio) catalyst mixture was added and the reaction mixture then heated to reflux for about 4½ hours. Volatiles were collected in the Dean-Stark trap at head temperatures of 75° to 108° C. Upon cooling a solid precipitated which was removed by filtration thru a coarse frit glass filter and washed several times with hexane. The amber filtrate was washed with a saturated aqueous sodium bicarbonate solution and then placed over calcium sulfate to dry. The next day the solution was filtered thru a medium frit glass filter and then the solvent stripped off under vacuum (about 20 mm. of mercury pressure) by heating to a pot temperature of 70° C. A light brown residue (66 g.) remained to which 66 ml. of hexane was added causing a solid to quickly precipitate. Three days later the mixture was filtered thru a medium frit glass filter and then the filtrate stripped under a vacuum of about 1 mm. of mercury presssure by heating to a pot temperature of 210° C. (head temperature 200° C.) to obtain 52 g. of a hazy rust colored residue. The following day 2 g. of fuller's earth and 3 g. of carbon black was added to the residue and the mixture agitated for 2½ hours before passing it thru a medium frit glass filter and diatomaceous silica (Super-Cel) to obtain 38 g. of a crystal clear, water white filtrate. Nuclear magnetic resonance and infrared analysis of the resulting product indicated it to be a naphthoxy substituted dimethylsiloxane fluid of the general formula

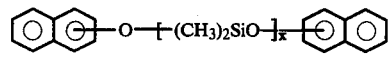

wherein x has an average value of about 8. This fluid was found to have a viscosity of 22 centistokes, a dielectric constant of 3.21 at 100 Hertz and 3.21 at $10^5$ Hertz, a dissipation factor of 0.0028 at 100 Hertz and 0.00002 at $10^5$ Hertz, a volume resistivity of $2.0 \times 10^{13}$, a corona inception voltage in the range of 2700 to 100, and a corona extinction voltage of 1950.

EXAMPLE 2

Following the procedure of Example 1 a methoxy endblocked dimethylsiloxane fluid was first prepared from 400 g. of dimethylcyclosiloxanes and 77 g. of dimethyldimethoxysilane and then 75 g. of that fluid reacted with 35 g. of 2-naphthol to obtain a naphthoxy substituted dimethylsiloxane fluid. This fluid has a viscosity of 30 centistokes, a dielectric constant of 3.05 at 100 Hertz and $10^5$ Hertz, a dissipation factor of 0.00019 at 100 Hertz and 0.00003 at $10^5$ Hertz, and a volume resistivity of $1.7 \times 10^{13}$.

EXAMPLE 3

Following the procedure of Example 1 a methoxy endblocked dimethylsiloxane fluid was first prepared from 402 g. of dimethylcyclosiloxanes and 146 g. of dimethyldimethoxysilane and then 77 g. of that fluid reacted with 45 g. of 2-naphthol to obtain a naphthoxy substituted dimethylsiloxane fluid. This fluid had a viscosity of 21 centistokes, a dielectric constant of 3.26 at 100 Hertz and $10^5$ Hertz, a dissipation factor of 0.00078 at 100 Hertz and zero at $10^5$ Hertz, and a volume resistivity of $3.1 \times 10^{12}$.

EXAMPLE 4

In a 500 ml. flask equipped with a Dean-Stark trap and condenser connected to a dry-ice trap and drying tower, and a magnetic stirrer, there was combined 2 g. of the acid ion-exchange resin catalyst employed in Example 1, 75 g. of dimethylcyclosiloxanes, 30 g. of 2-naphthol and 100 ml. of toluene. This mixture was heated at reflux for about 6½ hours during which time 1.7 ml. of water was removed via the trap. The reaction mixture was then cooled (whereupon a solid precipitate formed) and passed through a coarse glass frit filter. The following day the filtrate was stripped under a vacuum of about 1 mm. of mercury pressure (pot temperature 230° C., head temperature 205° C., sides 220° C.) to obtain about 70 g. of a yellow residue. About 2 g. of activated fuller's earth and 2 g. activated carbon (Nuchar) were added to this residue and the mixture agitated for about an hour before filtering through diatomaceous silica (Super-Cel) using a medium glass frit filter. About 50 g. of a very slightly tinted naphthoxy substituted dimethylsiloxane fluid was obtained. This fluid had a viscosity of 27 centistokes, a dielectric constant of 3.16 at 100 Hertz and $10^5$ Hertz, a dissipation factor of 0.00114 at 100 Hertz and zero at $10^5$ Hertz, and a volume resistivity of $2.8 \times 10^{12}$.

EXAMPLE 5

Following the procedure of Example 4, 300 g. of dimethylcyclosiloxanes and 130 g. of 2-naphthol were reacted in 400 ml. of toluene using 8 g. of the acid catalyst to obtain a naphthoxy substituted dimethylsiloxane fluid of the general formula

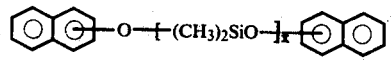

wherein x has an average value of about 9. This fluid was found to have a viscosity of 25 centistokes, a dielectric constant of 3.21 at 100 Hertz and 3.19 at $10^5$ Hertz, a dissipation factor of 0.00097 at 100 Hertz and 0.00003 at $10^5$ Hertz, a volume resistivity of $1.2 \times 10^{13}$, a flash point of 475° F., a fire point of 570° F., a corona inception voltage of about 2800, and a corona extinction voltage of about 1700.

EXAMPLE 6

Following the procedure of Example 4, 300 g. of dimethylcyclosiloxanes and 194 g. of 2-naphthol were reacted in 400 ml. of toluene using 9 g. of the acid catlayst to obtain a naphthoxy substituted dimethylsiloxane fluid of the general formula

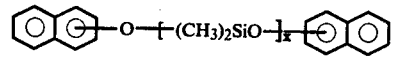

wherein x has an average value of about 6. This fluid was found to have a viscosity of 28 centistokes, a dielectric constant of 3.23 at 100 Hertz and $10^5$ Hertz, a dissipation factor of 0.00395 at 100 Hertz and 0.00013 at $10^5$ Hertz, and a volume resistivity of $1.45 \times 10^{12}$.

EXAMPLE 7

Following the procedure of Example 4, 300 g. of dimethylcyclosiloxanes and 97.2 g. of 2-naphthol were reacted in 400 ml. of toluene using 8 g. of the acid catalyst to obtain a naphthoxy substituted dimethylsiloxane fluid of the general formula

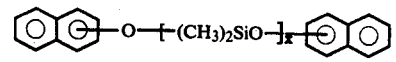

wherein x has an average value of about 12. This fluid was found to have a viscosity of 26 centistokes, a dielectric constant of 3.13 at 100 Hertz and $10^5$ Hertz, a dissipation factor of 0.00060 at 100 Hertz and 0.00038 at $10^5$ Hertz, a volume resistivity of $1.1 \times 10^{13}$, a corona inception voltage of 3000, a corona extinction voltage of 2100, a flash point of 360° F., and a fire point of 520° F. The fluid product (113 g.) was restripped to obtain 104 g. of fluid having a viscosity of 27 centistokes. The restripped fluid had a dielectric constant of 3.13 at 100 Hertz, a corona inception voltage of 2800, and a corona extinction voltage of 1700. Proper stripping is important if fluids are to be obtained which have enhanced flash and fire points.

EXAMPLE 8

Following the procedure of Example 4, 302 g. of dimethylcyclosiloxanes and 194 g. of 2-naphthol were reacted in 400 ml. of toluene using 8 g. of the acid catalyst to obtain a naphthoxy substituted dimethylsiloxane fluid having the general formula

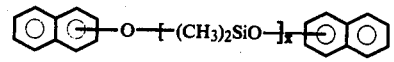

wherein x has an average value of about 6. This fluid was found to have a viscosity of 24 centistokes, a dielectric constant of 3.26 at 100 Hertz and 3.24 at $10^5$ Hertz, a dissipation factor of 0.02010 at 100 Hertz and 0.00010 at $10^5$ Hertz, a volume resistivity of $2.52 \times 10^{11}$, a corona inception voltage of 2900, a corona extinction voltage of 1800, a flash point of 485° F., and a fire point of 560° F.

EXAMPLE 9

In a 500 ml. flask equipped as in Example 4 there was combined 74 g. of a hydroxyl endblocked polydimethylsiloxane fluid having a viscosity of about 40 centistokes, 24 g. of 2-naphthol, 100 ml. of toluene, and 2 g. of the acid catalyst used in Example 4. This mixture was heated at reflux for about seven hours during which time water was removed via the trap. The mixture was cooled to room temperature and then passed through a coarse glass frit filter to remove the small amount of precipitate, refiltered through a medium glass frit filter, washed with hexane, filtered again, and then stripped under a vacuum of about 1 mm. of mercury pressure (pot temperature 230° C., head temperature 200° C., side temperature 220° C.) to obtain about 62 g. of a slightly yellow, clear residue. To this residue there was added 2 g. of activated fuller's earth and 2 g. of activated carbon (Nuchar) and the resulting mixture agitated for about 3¾ hours before filtering through diatomaceous silica (Super-Cel) using a medium glass frit filter to obtain 47 g. of a clear colorless naphthoxy substituted dimethylsiloxane fluid. This fluid was found to have a viscosity of 30 centistokes, a dielectric constant of 3.09 at 100 Hertz and $10^5$ Hertz, a dissipation factor of 0.00030 at 100 Hertz and 0.00003 at $10^5$ Hertz, and a volume resistivity of $1.3 \times 10^{13}$.

EXAMPLE 10

Following the procedure of Example 9, 55 g. of the hydroxyl endblocked polydimethylsiloxane fluid and 56 g. of 2-naphthol were reacted in 100 ml. of toluene using 2 g. of the acid catalyst to obtain a naphthoxy substituted dimethylsiloxane fluid having the general formula

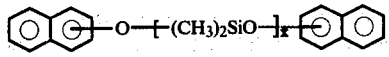

wherein x has an average value of about 5. This fluid was found to have a viscosity of 26 centistokes, a dielectric constant of 3.41 at 100 Hertz and $10^5$ Hertz, a dissipation factor of 0.00403 at 100 Hertz and 0.00013 at $10^5$ Hertz, a volume resistivity of $1.3 \times 10^{12}$, a corona inception voltage of 2900, and a corona extinction voltage of 1600.

EXAMPLE 11

In a 500 ml. flask equipped with a mechanical stirrer, Dean-Stark trap and condenser there was combined 75 g. of a hydroxyl endblocked polydimethylsiloxane fluid-dimethylcyclosiloxane mixture containing about 4.2 percent hydroxyl groups, 32 g. of 2-naphthol, 100 ml. of toluene and 2 g. of the acid catalyst of Example 4. The mixture was heated at reflux for about 4 hours, the water produced by the reaction being removed via the trap. The mixture was cooled to room temperature, filtered through a coarse glass frit filter and then stripped under a vacuum of about 1 mm. mercury (pot temperature 220° C., head temperature 200° C., side temperature 210° C.) to obtain 77 g. of a hazy residue. To this residue there was added 3 weight percent of activated fuller's earth and 4 weight percent of activated carbon (Nuchar) and the resulting mixture agitated for about 1½ hours before filtering through diatomaceous silica (Super-Cel) using a medium glass frit filter to obtain 55 g. of a clear, nearly colorless, naphthoxy substituted dimethysiloxane fluid. This fluid was found to have a viscosity of 28 centistokes, a dielectric constant of 3.17 at 100 Hertz and $10^5$ Hertz, a dissipation factor of 0.00028 at 100 Hertz and 0.00003 at $10^5$ Hertz, and a volume resistivity of $2.5 \times 10^{13}$.

EXAMPLE 12

Following the procedure of Example 11, 77 g. of the hydroxyl endblocked polydimethylsiloxane fluid-dimethylcyclosiloxane mixture was reacted with 31 g. of 2-naphthol in 100 ml. of toluene using 2 g. of an acid clay catalyst (Filtrol 20) to obtain a naphthoxy substituted dimethylsiloxane fluid. This fluid was found to have a viscosity of 24 centistokes, a dielectric constant of 3.17 at 100 Hertz and $10^5$ Hertz, a dissipation factor of 0.00038 at 100 Hertz and 0.00005 at $10^5$ Hertz, and a volume resistivity of $2.1 \times 10^{13}$.

EXAMPLE 13

Following the procedure of Example 11, 75 g. of the hydroxyl endblocked polydimethylsiloxane fluid-dimethylcyclosiloxane mixture was reacted with 30 g. of 2-naphthol in 50 ml. of toluene using 2 g. of an acid clay catalyst (Filtrol 20) to obtain a naphthoxy substituted dimethylsiloxane fluid. This fluid was found to have a viscosity of 24 centistokes, a dielectric constant of 3.17 at 100 Hertz and 3.18 at $10^5$ Hertz, a dissipation factor of 0.00048 at 100 Hertz and 0.0005 at $10^5$ Hertz, and a volume resistivity of $1.2 \times 10^{13}$.

EXAMPLE 14

Following the procedure of Example 11, 75 g. of the hydroxyl endblocked polydimethylsiloxane fluid-dimethylcyclosiloxane mixture was reacted with 30 g. of 2-naphthol in 25 ml. of toluene using 2 g. of an acid clay catalyst (Filtrol 20) to obtain a naphthoxy substituted dimethylsiloxane fluid. This fluid was found to have a viscosity of 25 centistokes, a dielectric constant of 3.16 at 100 Hertz and 3.15 at $10^5$ Hertz, a dissipation factor of 0.00121 at 100 Hertz and 0.0003 at $10^5$ Hertz, and a volume resistivity of $1.7 \times 10^{13}$.

EXAMPLE 15

In a 500 ml. flask equipped as in Example 4, and following the procedure of Example 11, 70 g. of the hydroxyl endblocked polydimethylsiloxane fluid-dimethycyclosiloxane mixture was reacted with 30 g. of 1-naphthol in 100 ml. of toluene using 2 g. of the acid catalyst to obtain a naphthoxy substituted dimethylsiloxane fluid. This fluid had a viscosity of 40 centistokes, a dielectric constant of 3.15 at 100 Hertz and 3.14 at $10^5$ Hertz, a dissipation factor of 0.00019 at 100 Hertz and 0.00002 at $10^5$ Hertz, and a volume resistivity of $6.3 \times 10^{12}$. A sample of the same fluid treated with fuller's earth and activated carbon (Nuchar) before stripping had a dielectric constant of 3.13 at 100 Hertz and $10^5$ Hertz, a dissipation factor of 0.00185 at 100 Hertz and 0.00008 at $10^5$ Hertz, a volume resistivity of $3.61 \times 10^{12}$, a corona inception voltage of 2700, and a corona extinction voltage of 1600.

EXAMPLE 16

To a 2000 pound glass lined reactipon vessel, under nitrogen, there was added 920 pounds of dimethylcyclosiloxanes, 240 pounds of dimethyldimethoxysilane and 21 pounds of an acid clay catalyst (Filtrol 20). The resulting mixture was heated to 85° C. over a period of two hours, then refluxed at 85° C. for four hours, and then cooled to room temperature. The unagitated mixture separated in two hours and most of the catalyst was removed from the bottom of the vessel. The product remaining in the reaction vessel was then filtered through a multi-element cartridge filter and drummed off. About 1108 pounds of methoxy endblocked dimethylsiloxane fluid were produced.

To a 2000 pound glass lined reaction vessel, under nitrogen, there was added 910 pounds of the above produced methoxy endblocked dimethylsiloxane fluid, 320 pounds of beta-naphthol and 3.6 pounds of sodium methylate catalyst. These reactants were mixed and then heated to 145° C. over a period of 2½ hours. The volatiles were collected, the temperature was held at 145° C., and the reaction continued for eight hours. The product was cooled to room temperature, unloaded through the top of the vessel with a portable pump, then filtered through a coated plate and frame filter, and finally drummed off. About 976 pounds of crude naphthoxy substituted dimethylsiloxane fluid was obtained.

To a 200 gallon strip still, under nitrogen, there was added 960 pounds of the above prepared crude naphthoxy substituted dimethylsiloxane fluid and 2 pounds of acetic acid. Under full vacuum (10–20 mm. of mercury pressure) it took eight hours to get the temperature up to 265° C. The product was held at 265° C. and 15 mm of mercury pressure for three hours and then cooled to room temperature. A small amount of nitrogen was continuously bubbled through the pot. The product was then drummed off with about 704 pounds of the stripped product being obtained.

To a 2000 pound glass lined vessel there was added 696 pounds of the above prepared stripped product and 20 pounds of fuller's earth. (Note: It is important to use dry fuller's earth to prevent hydrolysis of the product.) The resulting mixture was agitated for ten hours, then heated at 80° C. with agitation for one hour, then cooled to room temperature before filtering through a coated plate and frame filter and drumming off the product. About 621 pounds of the relatively pure naphthoxy substituted dimethylsiloxane fluid having the general formula

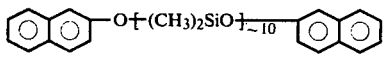

was obtained. This fluid was found to have a viscosity of 23 centistokes, a dielectric constant of 3.16 at 100 Hertz, a dissipation factor of 0.0135 at 100 Hertz, an open cup flash point of 450° F., and a fire point of about 585° F.

EXAMPLE 17

A mixture of 518 g. of dimethylcyclosiloxanes, 136 g. of methyltrimethoxysilane and a few drops of trifluoromethane sulfonic acid was allowed to equilibrate at room temperature for about 72 hours. Then 155 g. of the resulting methoxy siloxane liquid and 51 g. of 2-naphthol were placed in a 500 ml., one-necked flask under a Dean-Stark trap, reflux condenser setup. Heat was applied to 150° C. for 2½ hours as volatiles, mostly methanol, were collected. The reaction mixture was cooled to room temperature, then 5 g. of triethylamine throughly mixed in, and then the mixture was vacuum stripped to 240° C. at 0.3 mm. of mercury pressure. The fluid was treated with fuller's earth and then vacuum filtered to a naphthoxy substituted dimethylsiloxane fluid of the general formula

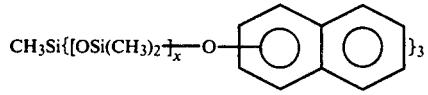

This fluid has a viscosity of 47 centistokes, a dielectric constant of 3.23 at 100 Hertz, and a dissipation factor of 0.0028 at 100 Hertz.

EXAMPLE 18

The procedure of Example 17 was repeated except that 150 g. of the methoxy siloxane and 69 g. of the 2-naphthol were placed in the 500 ml. flask. Heat was applied to as high as 180° C. and the volatiles collected. A few grams of calcium oxide were added after cooling and then the fluid stripped to 240° C. at 0.25 mm. of mercury pressure. The resulting naphthoxy substituted dimethylsiloxane fluid had a viscosity of 44 centistokes. After treatment with fuller's earth the fluid had a dielectric constant of 3.27 at 100 Hertz and a zero dissipation factor.

EXAMPLE 19

A mixture of 370 g. of dimethylcyclosiloxanes, 136 g. of methyltrimethoxysilane and a few drops of trifluoromethane sulfonic acid was allowed to equilibrate at room temperature for several days. Then 100 g. of the resulting methoxylated siloxane fluid and 43 g. of 2-naphthol were placed in a 500 ml, one-necked flask equipped with a Dean-Stark trap/reflux condenser setup and heated to 170° C. When volatiles were no longer being collected the reaction mixture was cooled, a few grams of calcium oxide mixed in, and then the fluid was stripped to 240° C. at 0.4 mm. of mercury pressure. A 75 g. quantity of the nonvolatilized fluid was treated with fuller's earth and filtered to obtain a naphthoxy substituted dimethylsiloxane fluid having a viscosity of 31.5 centistokes. This fluid had a dielectric constant of 3.46 at 100 Hertz and a dissipation factor of 0.00095 at 100 Hertz.

In the film/film capacitor the fluid of this example has a corona inception voltage of 1800 volts/mil and a corona extinction voltage of 1400 volts/mil. In the film/paper/film capacitor the fluid of this example had a corona inception voltage of 2400 volts/mil and a corona extinction voltage of 1100 volts/mil.

EXAMPLE 20

A mixture of 740 g. of dimethylcyclosiloxanes, 136 g. of methyltrimethoxysilane and a few drops of trifluoromethane sulfonic acid was allowed to equilibrate at room temperature for several days. Then 150 g. of the resulting methoxylated siloxane fluid and 39 g. of 2-naphthol were placed in a 500 ml., one-necked flask equipped with a Dean-Stark trap/reflux condenser setup. These reactants were heated at 150° C. for two hours, then at 200° C. for two more hours, as volatiles were collected. After cooling, the reaction mixture was combined with a few grams of sodium acetate and then stripped to 240° C. at 0.4 mm. of mercury pressure. The remaining fluid was treated with fuller's earth and then filtered to obtain a naphthoxy substituted dimethylsiloxane fluid having a viscosity of 35.8 centistokes. This fluid had a dielectric constant of 3.20 and a dissipation factor of 0.00042 at 100 Hertz. In the film/film capacitor the fluid of this example had a corona inception voltage of about 1900 and a corona extinction voltage of about 1200. In the film/paper/film capacitor the fluid of this example had a corona inception voltage of about 2200 and a corona extinction voltage of about 600.

EXAMPLE 21

A mixture of 130.4 g. of a siloxane having the general formula $H[(CH_3)_2SiO]_9Si(CH_3)_2H$, 51.6 g. of 2-naphthol and 5 ml. of triethylamine was heated at 150° C. for four hours with stirring. The reaction mixture was then stripped to 255° C. at 0.6 mm. of mercury pressure to obtain a 22.3 centistoke naphthoxy substituted dimethylsiloxane fluid having the general formula

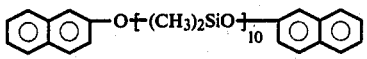

After treatment with fuller's earth this fluid had a dielectric constant of 3.16 and a dissipation factor of 0.00392 at 100 Hertz.

That which is claimed is:

1. A capacitor containing a dielectric fluid which is a naphthoxy substituted dimethylsiloxane having a viscosity of less than about 50 centistokes at 25° C., said dielectric fluid having the general formula

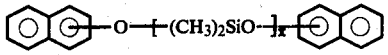

wherein x has an average value ranging from about 6 to about 15.

2. A capacitor as defined in claim 1 wherein the dielectric fluid has the general formula

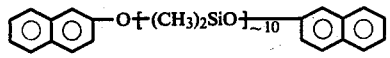

3. A capacitor containing a dielectric fluid which is a naphthoxy substituted dimethylsiloxane having a viscosity of less than about 50 centistokes at 25° C., said dielectric fluid having the general formula

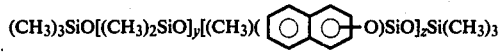

wherein y has an average value ranging from 1 to 10, z has an average value ranging from 1 to 10, and the number of y units is at least as great as the number of z units.

4. A capacitor containing a dielectric fluid which is a naphthoxy substituted dimethylsiloxane having a viscosity of less than about 50 centistokes at 25° C., said dielectric fluid being a cyclic siloxane.

5. A capacitor containing a dielectric fluid which is a naphthoxy substituted dimethylsiloxane having a viscosity of less than about 50 centistokes at 25° C., said dielectric fluid having the general formula

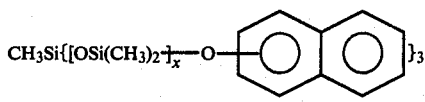

wherein x has an average value ranging from about 2 to 22.

* * * * *

UNITED STATES PATENT AND TRADEMARK OFFICE
CERTIFICATE OF CORRECTION

PATENT NO. : 4,147,646
DATED : April 3, 1979
INVENTOR(S) : GERALD R. CAPPO

It is certified that error appears in the above—identified patent and that said Letters Patent are hereby corrected as shown below:

Column 1, line 56, the formula should read

Column 8, line 50, "reactipon" should read --reaction--

Signed and Sealed this

Ninth Day of October 1979

[SEAL]

Attest:

RUTH C. MASON
Attesting Officer

LUTRELLE F. PARKER
Acting Commissioner of Patents and Trademarks